United States Patent
Kim et al.

(10) Patent No.: US 10,831,189 B2
(45) Date of Patent: Nov. 10, 2020

(54) LEARNING METHOD AND LEARNING DEVICE FOR PROVIDING FUNCTIONAL SAFETY BY WARNING DRIVER ABOUT POTENTIAL DANGEROUS SITUATION BY USING EXPLAINABLE AI WHICH VERIFIES DETECTION PROCESSES OF AUTONOMOUS DRIVING NETWORK, AND TESTING METHOD AND TESTING DEVICE USING THE SAME

(71) Applicant: StradVision, Inc., Gyeongsangbuk-do (KR)

(72) Inventors: Kye-Hyeon Kim, Seoul (KR); Yongjoong Kim, Gyeongsangbuk-do (KR); Hak-Kyoung Kim, Gyeongsangbuk-do (KR); Woonhyun Nam, Gyeongsangbuk-do (KR); SukHoon Boo, Gyeonggi-do (KR); Myungchul Sung, Gyeongsangbuk-do (KR); Dongsoo Shin, Gyeonggi-do (KR); Donghun Yeo, Gyeongsangbuk-do (KR); Wooju Ryu, Gyeongsangbuk-do (KR); Myeong-Chun Lee, Gyeongsangbuk-do (KR); Hyungsoo Lee, Seoul (KR); Taewoong Jang, Seoul (KR); Kyungjoong Jeong, Gyeongsangbuk-do (KR); Hongmo Je, Gyeongsangbuk-do (KR); Hojin Cho, Gyeongsangbuk-do (KR)

(73) Assignee: StradVision, Inc., Gyeongsangbuk-do (KR)

( * ) Notice: Subject to any disclaimer, the term of this patent is extended or adjusted under 35 U.S.C. 154(b) by 0 days.

(21) Appl. No.: 16/724,428

(22) Filed: Dec. 23, 2019

(65) Prior Publication Data
US 2020/0249671 A1  Aug. 6, 2020

Related U.S. Application Data

(60) Provisional application No. 62/799,186, filed on Jan. 31, 2019.

(51) Int. Cl.
*G06N 3/08* (2006.01)
*G06N 3/04* (2006.01)
(Continued)

(52) U.S. Cl.
CPC ......... *G05D 1/0055* (2013.01); *G05D 1/0088* (2013.01); *G06K 9/3233* (2013.01);
(Continued)

(58) Field of Classification Search
None
See application file for complete search history.

(56) References Cited

U.S. PATENT DOCUMENTS

2014/0368668 A1* 12/2014 Sasabuchi .......... G06K 9/00523
348/187

OTHER PUBLICATIONS

Ramanagopal, M.S. et al., "Failing to learn: autonomously identifying perception failures for self-driving cars," downloaded from <https://arxiv.org/abs/1707.00051v4>, available online as of Jul. 26, 2018, 8 pp. (Year: 2018).*

(Continued)

*Primary Examiner* — Kakali Chaki
*Assistant Examiner* — Brian M Smith
(74) *Attorney, Agent, or Firm* — Husch Blackwell LLP

(57) ABSTRACT

A learning method for providing a functional safety by warning a driver about a potential dangerous situation by using an explainable AI which verifies detection processes of a neural network for an autonomous driving is provided.

(Continued)

And the learning method includes steps of: (a) a learning device for verification, if at least one training image for verification is acquired, instructing a property extraction module to apply extraction operation to the training image for verification to extract property information on characteristics of the training image for verification to thereby generate a quality vector; (b) the learning device for verification instructing the neural network for verification to apply first neural network operations to the quality vector, to thereby generate predicted safety information; and (c) the learning device for verification instructing a loss module to generate a loss, and perform a backpropagation by using the loss, to thereby learn parameters included in the neural network for verification.

18 Claims, 4 Drawing Sheets

(51) Int. Cl.
  *G06K 9/46* (2006.01)
  *G06K 9/62* (2006.01)
  *G05D 1/00* (2006.01)
  *G06K 9/32* (2006.01)
(52) U.S. Cl.
  CPC ............ *G06K 9/46* (2013.01); *G06K 9/6256* (2013.01); *G06K 9/6267* (2013.01); *G06N 3/0418* (2013.01); *G06N 3/084* (2013.01); *G05D 2201/0213* (2013.01)

(56) References Cited

OTHER PUBLICATIONS

Chernov, T. et al., "Application of dynamic saliency maps to the video stream recognition systems with image quality assessment," 11th Intl. Conf. on Machine Vision (ICMV 2018) SPIE vol. 11041, 8 pp. (Year: 2018).*

Jeatruakul, P. et al., "Comparing the performance of different neural networks for binary classification problems," 2009 Eighth Intl. Symp. on Natural Language Processing (2009) pp. 111-115. (Year: 2009).*

Montano, J.J. et al., "Numeric sensitivity analysis applied to feedforward neural networks," Neural Comput. & Applic. vol. 12 (2003) pp. 119-125. (Year: 2003).*

Zhang, M. et al, "DeepRoad: GAN-based metamorphic testing and input validation system for autonomous driving systems," Proc. of the 33rd ACM/IEEE INtol. Conf. on Automated Software Engineering (2018) pp. 132-142. (Year: 2018).*

Abdessalem, Raja Ben, Nejati, Shiva, Briand, Lionel C., Stifter, Thomas, Testing Advanced Driver Assistance Systems using Multiple-objective Search and Neural Networks.

* cited by examiner

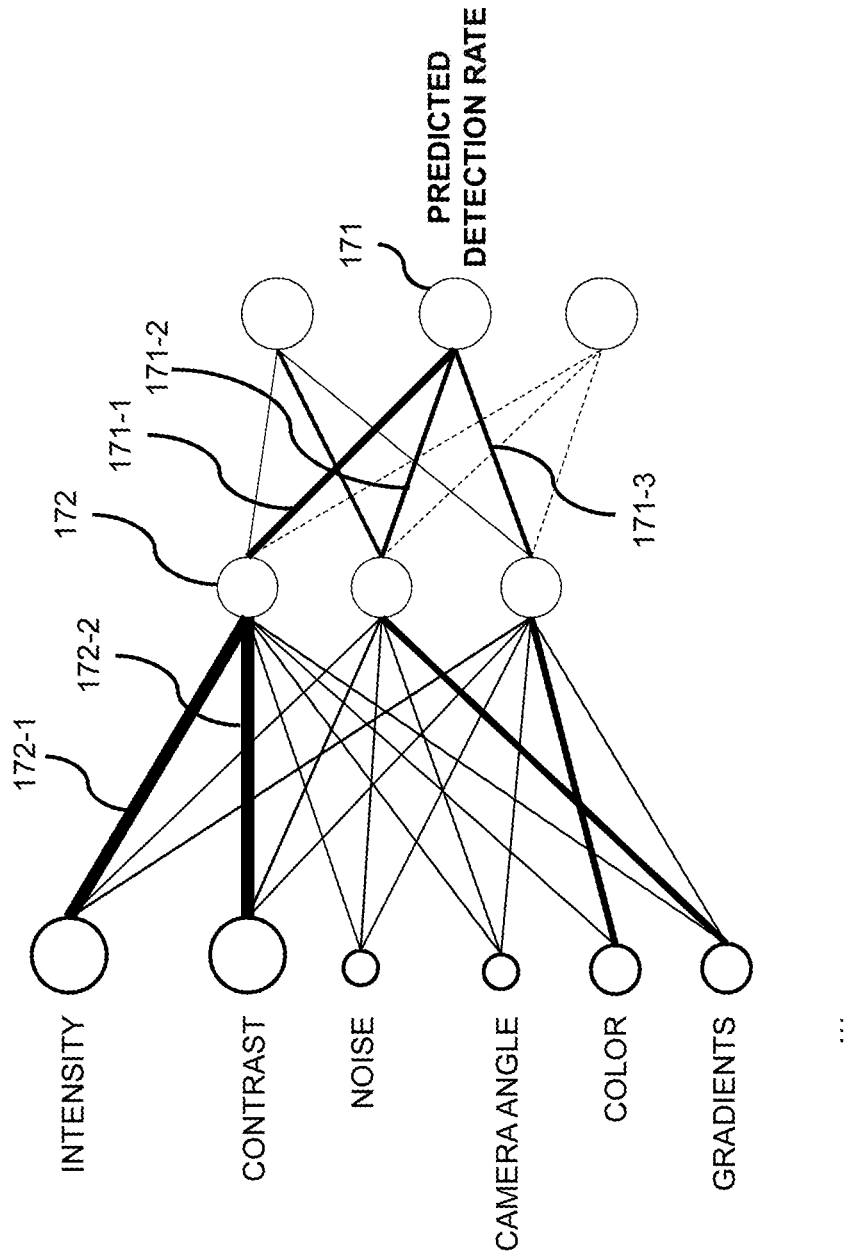

LEARNING METHOD AND LEARNING DEVICE FOR PROVIDING FUNCTIONAL SAFETY BY WARNING DRIVER ABOUT POTENTIAL DANGEROUS SITUATION BY USING EXPLAINABLE AI WHICH VERIFIES DETECTION PROCESSES OF AUTONOMOUS DRIVING NETWORK, AND TESTING METHOD AND TESTING DEVICE USING THE SAME

CROSS REFERENCE OF RELATED APPLICATION

This present application claims the benefit of the earlier filing date of provisional patent application No. 62/799,186, filed Jan. 31, 2019, the entire contents of which being incorporated herein by reference.

FIELD OF THE DISCLOSURE

The present disclosure relates to a learning method and a learning device for use with an autonomous vehicle; and more particularly, to the learning method and the learning device for providing a functional safety by warning a driver about a potential dangerous situation by using an explainable AI which verifies detection processes of a neural network for an autonomous driving and a testing method and a testing device using the same.

BACKGROUND OF THE DISCLOSURE

Deep Convolutional Neural Networks (Deep CNNs) are at the heart of the remarkable development in deep learning. CNNs have already been used in the 90's to solve problems of character recognition, but their use has become as widespread as it is now thanks to recent researches. These CNNs have won the 2012 ImageNet image classification tournament, crushing other competitors. Then, the CNNs became a very useful tool in the field of the machine learning.

Such CNNs are also used in a field of autonomous driving. When used in the field of autonomous driving, the CNNs mainly receive images from a camera, process the images to detect an object on the images, perform a semantic segmentation, and find a free space.

As such, when using the CNNs in the field of autonomous driving, the most important thing is reliabilities of images obtained from the camera. Even though the CNNs are designed to have an efficient structure to produce accurate results, autonomous driving cannot be safe if images to be fed into the CNNs are abnormal.

Therefore, it is necessary to determine in real-time the reliabilities of the images to be fed into the CNN to decide the safety of the autonomous driving, but such technologies have not been studied much.

SUMMARY OF THE DISCLOSURE

It is an object of the present disclosure to solve all the aforementioned problems.

It is another object of the present disclosure to provide a learning method for quantitatively determining whether at least one image is appropriate to object detection by using property information of the image and notifying a user, to thereby allow a safe autonomous driving.

In accordance with one aspect of the present disclosure, there is provided a learning method for providing a functional safety by warning a driver about a potential dangerous situation by using an explainable AI which verifies detection processes of a neural network for an autonomous driving, including steps of: (a) a learning device for verification, to be used for training a neural network for verification, if at least one training image for verification is acquired, instructing a property extraction module to apply at least one extraction operation to the training image for verification in order to extract property information on at least part of characteristics of the training image for verification, including at least part of an intensity, a contrast, a noise, a chroma, a color, gradients, a brightness and a camera angle, to thereby generate a quality vector corresponding to the training image for verification; (b) the learning device for verification instructing the neural network for verification to apply one or more first neural network operations to the quality vector, to thereby generate predicted safety information on a probability of being safe to perform an autonomous driving by using the training image for verification; and (c) the learning device for verification instructing a loss module to generate a loss by referring to the predicted safety information and GT safety information corresponding to the training image for verification, and perform a backpropagation by using the loss, to thereby learn at least part of parameters included in the neural network for verification.

As one example, at the step of (b), the learning device for verification instructs the neural network for verification to perform a process of (i) a regression by applying at least part of the first neural network operations to the quality vector, to thereby generate a predicted detection rate corresponding to a ratio of (r1) the number of specific objects, among objects included in the training image for verification, predicted to be correctly detected by the neural network for the autonomous driving, to (r2) the number of the objects included in the training image for verification, and (ii) a classification by applying at least part of the first neural network operations to the quality vector, to thereby generate predicted binary information representing whether it is safe to perform the autonomous driving by using the training image for verification or not, in order to generate the predicted safety information including the predicted detection rate and the predicted binary information.

As one example, before the step (c), the learning device for verification instructs the neural network for the autonomous driving, included in an autonomous driving system, to apply one or more second neural network operations to the training image for verification, in order to predict information on objects included in the training image for verification, to thereby generate a predicted object detection result, and instructs a GT generating module interlocking with the neural network for the autonomous driving to calculate a GT detection rate by referring to the predicted object detection result and a GT object detection result including correct information on the objects included in the training image for verification, and to generate GT binary information by referring to information on whether the GT detection rate is larger than a prescribed threshold, to thereby generate the GT safety information including the GT detection rate and the GT binary information.

As one example, at the step of (a), the learning device for verification instructs the property extraction module to perform at least one of (i) a process of generating each piece of local property information on each region of the training image for verification by dividing the training image for verification into a plurality of regions, and applying the extraction operation to each region, and (ii) a process of generating global property information on a whole part of the training image for verification by applying the extraction operation to the whole part of the training image for verification, to thereby generate the quality vector including at least one of the local property information and the global property information.

In accordance with another aspect of the present disclosure, there is provided a testing method for providing a functional safety by warning a driver about a potential dangerous situation by using an explainable AI which verifies detection processes of a neural network for an autonomous driving, including steps of: (a) on condition that (1) a learning device for verification, to be used for training a neural network for verification, if at least one training image for verification is acquired, has instructed a property extraction module to apply at least one extraction operation to the training image for verification in order to extract property information for training on at least part of characteristics of the training image for verification, including at least part of an intensity, a contrast, a noise, a chroma, a color, a gradient, a brightness and a camera angle, to thereby generate a quality vector for training corresponding to the training image for verification; (2) the learning device for verification has instructed the neural network for verification to apply one or more first neural network operations to the quality vector for training, to thereby generate predicted safety information for training on a probability of being safe to perform an autonomous driving by using the training image for verification; and (3) the learning device for verification has instructed a loss module to generate a loss by referring to the predicted safety information for training and GT safety information corresponding to the training image for verification, and perform a backpropagation by using the loss, to thereby learn at least part of parameters included in the neural network for verification, a testing device for verification, if at least one test image for verification is acquired, instructing the property extraction module to apply the extraction operation to the test image for verification in order to extract property information for testing on at least part of characteristics of the test image for verification, including at least part of an intensity, a contrast, a noise, a chroma, a color, a gradient, a brightness and a camera angle, to thereby generate a quality vector for testing corresponding to the test image for verification; (b) the testing device for verification instructing the neural network for verification to apply the first neural network operations to the quality vector for testing, to thereby generate predicted safety information for testing on a probability of being safe to perform an autonomous driving by using the test image for verification; and (c) the testing device for verification instructing a notification module to transmit a 1-st notice to a driver in case it is predicted to be safe to use the test image for verification during the autonomous driving, and to transmit a 2-nd notice to the driver in case it is predicted to be unsafe to use the test image for verification during the autonomous driving, by referring to the predicted safety information for testing.

As one example, at the step of (b), the testing device for verification instructs the neural network for verification to perform a process of (i) a regression by applying at least part of the first neural network operations to the quality vector for testing, to thereby generate a predicted detection rate for testing corresponding to a ratio of (r1) the number of specific objects for testing, among objects for testing included in the test image for verification, predicted to be correctly detected by the neural network for the autonomous driving, to (r2) the number of the objects for testing included in the test image for verification, and (ii) a classification by applying at least part of the first neural network operations to the quality vector for testing, to thereby generate predicted binary information for testing representing whether it is safe to perform the autonomous driving by using the test image for verification or not, in order to generate the predicted safety information for testing including the predicted detection rate for testing and the predicted binary information for testing.

As one example, the testing device for verification instructs the notification module to transmit the 1-st notice to the driver in case the predicted binary information for testing indicates that it is safe to use the test image for verification during the autonomous driving, wherein the 1-st notice includes a (1_1)-st notice indicating that the autonomous driving is being executed safely, and a (1_2)-nd notice including information on the predicted detection rate for testing.

As one example, the testing device for verification instructs the notification module to transmit the 2-nd notice to the driver in case the predicted binary information for testing indicates that it is not safe to use the test image for verification during perform the autonomous driving, wherein the 2-nd notice includes a (2_1)-st notice indicating that the autonomous driving is not being executed safely, and a (2_2)-nd notice including predicted contribution information including information on which component of the test image for verification is causing unsafety of the autonomous driving.

As one example, the testing device for verification, in case the predicted binary information for testing represents that it is not safe to use the test image for verification during the autonomous driving, instructs a contribution prediction module to apply at least one reverse analysis operation to the predicted binary information for testing by using information on weight operation outputs, corresponding to components of the quality vector for testing, generated by each of convolutional neurons included in the neural network for verification, to thereby (i) select at least one specific component, among the components of the quality vector for testing, whose specific contribution score for the predicted binary information for testing is larger than a prescribed threshold, and (ii) generate the predicted contribution information, including information on which property of the test image for verification is causing the unsafety of the autonomous driving, by referring to the specific component.

As one example, the testing device for verification instructs the contribution prediction module to apply the reverse analysis operation to a final node value used for generating the predicted binary information for testing in a backward direction, to thereby (i) generate one or more contribution scores for at least part of the components of the quality vector for testing, (ii) select the specific component of the quality vector for testing whose specific contribution score is larger than the prescribed threshold, and (iii) generate the predicted contribution information by referring to the specific component, wherein the reverse analysis operation is used for iteratively selecting a specific (N−1)-th weight operation output which satisfies a prescribed criterion, among (N−1)-th weight operation outputs which have been used for generating a specific N-th weight operation output which satisfies the prescribed criterion.

As one example, at the step of (a), the testing device for verification instructs the property extraction module to perform at least one of (i) a process of generating each piece of local property information for testing on each region of the test image for verification by dividing the test image for verification into a plurality of regions, and applying the extraction operation to each region, and (ii) a process of generating global property information for testing on a whole part of the test image for verification by applying the extraction operation to the whole part of the test image for verification, to thereby generate the quality vector for testing including at least one of the local property information for testing and the global property information for testing.

In accordance with still another aspect of the present disclosure, there is provided a learning device for providing a functional safety by warning a driver about a potential dangerous situation by using an explainable AI which verifies detection processes of a neural network for an autonomous driving, including: at least one memory that stores instructions; and at least one processor configured to execute the instructions to perform processes of: (I) if at least one training image for verification is acquired, instructing a property extraction module to apply at least one extraction operation to the training image for verification in order to extract property information on at least part of characteristics of the training image for verification, including at least part of an intensity, a contrast, a noise, a chroma, a color, gradients, a brightness and a camera angle, to thereby generate a quality vector corresponding to the training image for verification; (II) instructing the neural network for verification to apply one or more first neural network operations to the quality vector, to thereby generate predicted safety information on a probability of being safe to perform an autonomous driving by using the training image for verification; and (III) instructing a loss module to generate a loss by referring to the predicted safety information and GT safety information corresponding to the training image for verification, and perform a backpropagation by using the loss, to thereby learn at least part of parameters included in the neural network for verification.

As one example, at the process of (II), the processor instructs the neural network for verification to perform a process of (i) a regression by applying at least part of the first neural network operations to the quality vector, to thereby generate a predicted detection rate corresponding to a ratio of (r1) the number of specific objects, among objects included in the training image for verification, predicted to be correctly detected by the neural network for the autonomous driving, to (r2) the number of the objects included in the training image for verification, and (ii) a classification by applying at least part of the first neural network operations to the quality vector, to thereby generate predicted binary information representing whether it is safe to perform the autonomous driving by using the training image for verification or not, in order to generate the predicted safety information including the predicted detection rate and the predicted binary information.

As one example, before the process (III), the processor instructs the neural network for the autonomous driving, included in an autonomous driving system, to apply one or more second neural network operations to the training image for verification, in order to predict information on objects included in the training image for verification, to thereby generate a predicted object detection result, and instructs a GT generating module interlocking with the neural network for the autonomous driving to calculate a GT detection rate by referring to the predicted object detection result and a GT object detection result including correct information on the objects included in the training image for verification, and to generate GT binary information by referring to information on whether the GT detection rate is larger than a prescribed threshold, to thereby generate the GT safety information including the GT detection rate and the GT binary information.

As one example, at the process of (I), the processor instructs the property extraction module to perform at least one of (i) a process of generating each piece of local property information on each region of the training image for verification by dividing the training image for verification into a plurality of regions, and applying the extraction operation to each region, and (ii) a process of generating global property information on a whole part of the training image for verification by applying the extraction operation to the whole part of the training image for verification, to thereby generate the quality vector including at least one of the local property information and the global property information.

In accordance with still yet another aspect of the present disclosure, there is provided a testing device for providing a functional safety by warning a driver about a potential dangerous situation by using an explainable AI which verifies detection processes of a neural network for an autonomous driving, including: at least one memory that stores instructions; and at least one processor configured to execute the instructions to perform processes of: (I) on condition that (1) a learning device for verification, to be used for training a neural network for verification, has instructed a property extraction module to apply at least one extraction operation to a training image for verification in order to extract property information for training on at least part of characteristics of the training image for verification, including at least part of an intensity, a contrast, a noise, a chroma, a color, a gradient, a brightness and a camera angle, to thereby generate a quality vector for training corresponding to the training image for verification; (2) the learning device for verification has instructed the neural network for verification to apply one or more first neural network operations to the quality vector for training, to thereby generate predicted safety information for training on a probability of being safe to perform an autonomous driving by using the training image for verification; and (3) the learning device for verification has instructed a loss module to generate a loss by referring to the predicted safety information for training and GT safety information corresponding to the training image for verification, and perform a backpropagation by using the loss, to thereby learn at least part of parameters included in the neural network for verification, if at least one test image for verification is acquired, instructing the property extraction module to apply the extraction operation to the test image for verification in order to extract property information for testing on at least part of characteristics of the test image for verification, including at least part of an intensity, a contrast, a noise, a chroma, a color, a gradient, a brightness and a camera angle, to thereby generate a quality vector for testing corresponding to the test image for verification; (II) instructing the neural network for verification to apply the first neural network operations to the quality vector for testing, to thereby generate predicted safety information for testing on a probability of being safe to perform an autonomous driving by using the test image for verification; and (III) instructing a notification module to transmit a 1-st notice to a driver in case it is predicted to be safe to use the test image for verification during the autonomous driving, and to transmit a 2-nd notice to the driver in case it is predicted to be unsafe to use the test image for verification during the autonomous driving, by referring to the predicted safety information for testing.

As one example, at the process of (II), the processor instructs the neural network for verification to perform a process of (i) a regression by applying at least part of the first neural network operations to the quality vector for testing, to thereby generate a predicted detection rate for testing corresponding to a ratio of (r1) the number of specific objects for testing, among objects for testing included in the test image for verification, predicted to be correctly detected by the neural network for the autonomous driving, to (r2) the number of the objects for testing included in the test image for verification, and (ii) a classification by applying at least part of the first neural network operations to the quality vector for testing, to thereby generate predicted binary information for testing representing whether it is safe to perform the autonomous driving by using the test image for verification or not, in order to generate the predicted safety information for testing including the predicted detection rate for testing and the predicted binary information for testing.

As one example, the processor instructs the notification module to transmit the 1-st notice to the driver in case the predicted binary information for testing indicates that it is safe to use the test image for verification during the autonomous driving, wherein the 1-st notice includes a (1_1)-st notice indicating that the autonomous driving is being executed safely, and a (1_2)-nd notice including information on the predicted detection rate for testing.

As one example, the processor instructs the notification module to transmit the 2-nd notice to the driver in case the predicted binary information for testing indicates that it is not safe to use the test image for verification during perform the autonomous driving, wherein the 2-nd notice includes a (2_1)-st notice indicating that the autonomous driving is not being executed safely, and a (2_2)-nd notice including predicted contribution information including information on which component of the test image for verification is causing unsafety of the autonomous driving.

As one example, the processor, in case the predicted binary information for testing represents that it is not safe to use the test image for verification during the autonomous driving, instructs a contribution prediction module to apply at least one reverse analysis operation to the predicted binary information for testing by using information on weight operation outputs, corresponding to components of the quality vector for testing, generated by each of convolutional neurons included in the neural network for verification, to thereby (i) select at least one specific component, among the components of the quality vector for testing, whose specific contribution score for the predicted binary information for testing is larger than a prescribed threshold, and (ii) generate the predicted contribution information, including information on which property of the test image for verification is causing the unsafety of the autonomous driving, by referring to the specific component.

As one example, the processor instructs the contribution prediction module to apply the reverse analysis operation to a final node value used for generating the predicted binary information for testing in a backward direction, to thereby (i) generate one or more contribution scores for at least part of the components of the quality vector for testing, (ii) select the specific component of the quality vector for testing whose specific contribution score is larger than the prescribed threshold, and (iii) generate the predicted contribution information by referring to the specific component, wherein the reverse analysis operation is used for iteratively selecting a specific (N−1)-th weight operation output which satisfies a prescribed criterion, among (N−1)-th weight operation outputs which have been used for generating a specific N-th weight operation output which satisfies the prescribed criterion.

As one example, at the process of (I), the processor instructs the property extraction module to perform at least one of (i) a process of generating each piece of local property information for testing on each region of the test image for verification by dividing the test image for verification into a plurality of regions, and applying the extraction operation to each region, and (ii) a process of generating global property information for testing on a whole part of the test image for verification by applying the extraction operation to the whole part of the test image for verification, to thereby generate the quality vector for testing including at least one of the local property information for testing and the global property information for testing.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings.

The following drawings to be used to explain example embodiments of the present disclosure are only part of example embodiments of the present disclosure and other drawings can be obtained based on the drawings by those skilled in the art of the present disclosure without inventive work.

FIG. 4 is a drawing schematically illustrating an operation of a contribution prediction module for performing a testing method for providing the functional safety by warning the driver about the potential dangerous situation by using the explainable AI which verifies detection processes of the neural network for the autonomous driving in accordance with one example embodiment of the present disclosure.

DETAILED DESCRIPTION OF THE PREFERRED EMBODIMENTS

Figure 1:
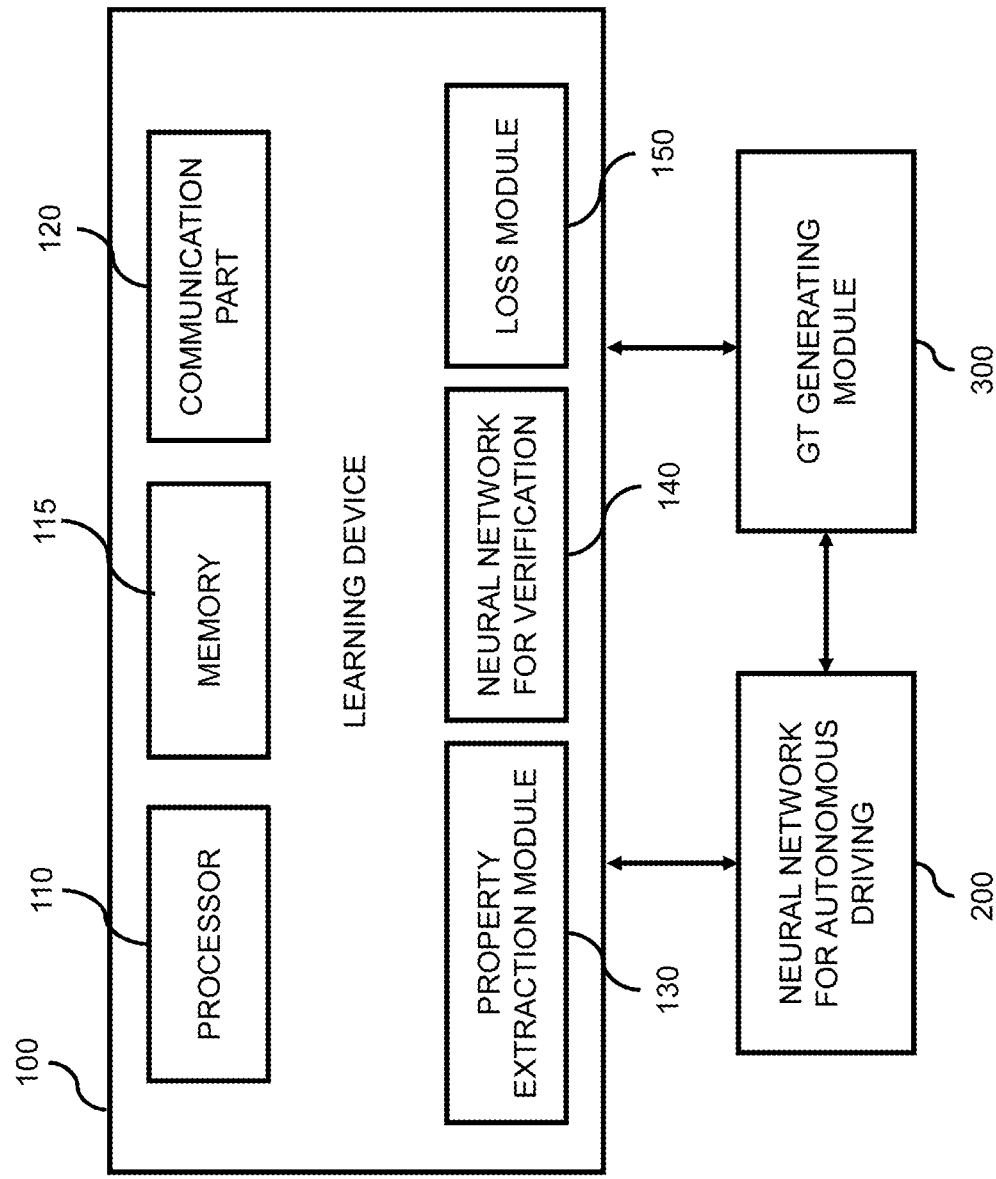
FIG. 1 is a drawing schematically illustrating a configuration of a learning device performing a learning method for providing a functional safety by warning a driver about a potential dangerous situation by using an explainable AI which verifies detection processes of a neural network for an autonomous driving in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the disclosure.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout the several views.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

To allow those skilled in the art to carry out the present disclosure easily, the example embodiments of the present disclosure by referring to attached diagrams will be explained in detail as shown below.

FIG. 1 is a drawing schematically illustrating a configuration of a learning device for verification performing a learning method for providing a functional safety by warning a driver about a potential dangerous situation by using an explainable AI which verifies detection processes of a neural network for an autonomous driving in accordance with one example embodiment of the present disclosure.

By referring to FIG. 1, the learning device for verification 100 may include at least one property extraction module 130, at least one neural network for verification 140, and at least one loss module 150, to be described later. Processes of input/output and computations of the property extraction module 130, the neural network for verification 140, and the loss module 150 may be respectively performed by at least one communication part 120 and at least one processor 110. However, detailed communication schematics between the communication part 120 and the processor 110 are omitted in FIG. 1. Herein, a memory 115 may have stored various instructions to be described later, and the processor 110 may execute the instructions stored in the memory and may perform processes of the present disclosure by executing the instructions to be disclosed later. Such description of the learning device for verification 100 does not exclude an integrated device including any combination of a processor, a memory, a medium, or any other computing components.

Additionally, in FIG. 1, the neural network for the autonomous driving 200 and a GT generating module 300 may be seen. The neural network for the autonomous driving 200 and the GT generating module 300 may be interlinked with each other. The neural network for the autonomous driving 200 and the GT generating module 300 may be included or not included in the learning device for verification 100, but it is assumed not to be included therein, for convenience. The neural network for the autonomous driving 200 and the GT generating module 300 will be explained later specifically.

The above description shows the configuration of the learning device for verification 100. And the learning method is described by referring to FIG. 2 as below.

Figure 2:
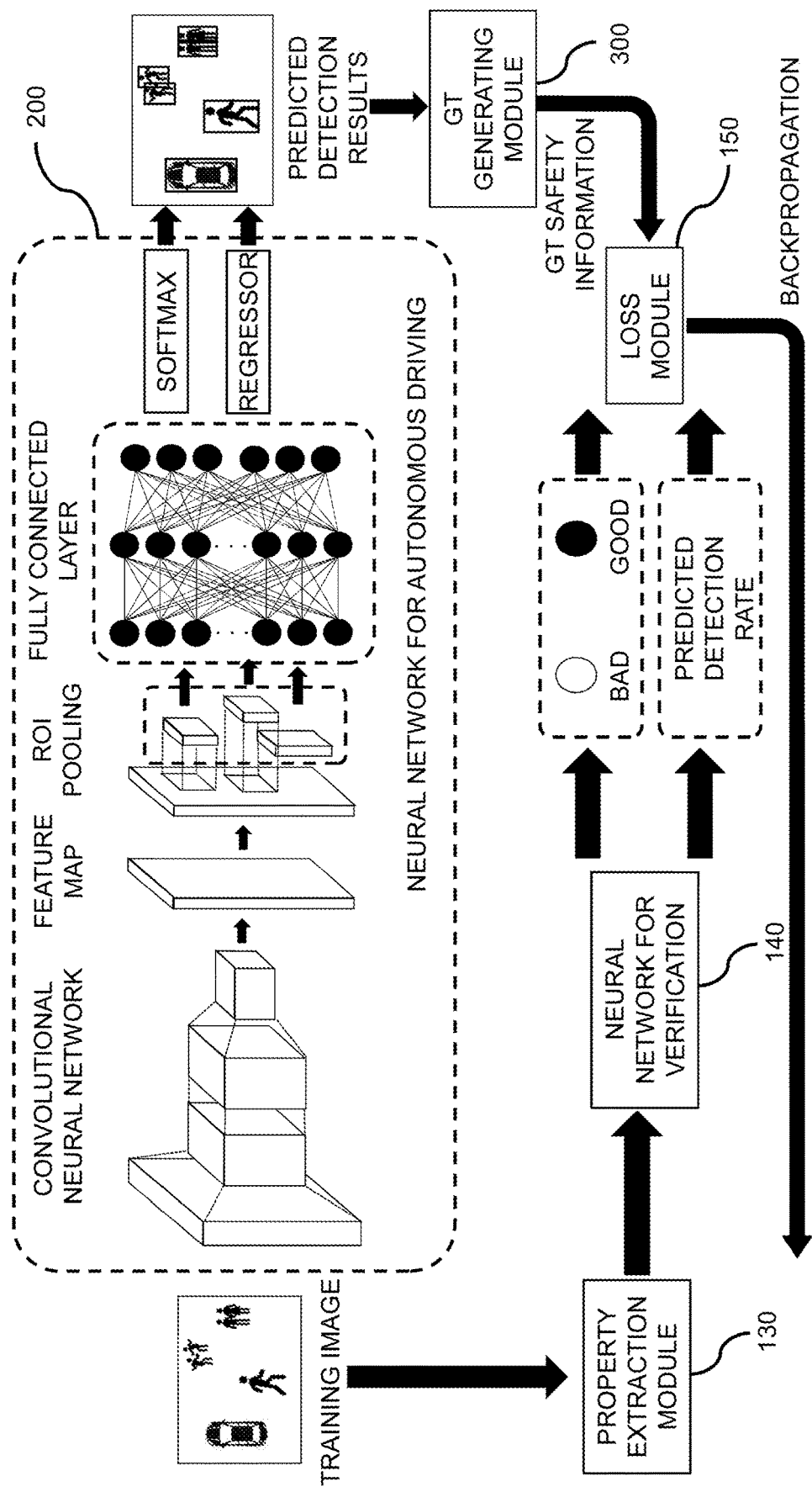
FIG. 2 is a flow chart schematically illustrating the learning method for providing the functional safety by warning the driver about the potential dangerous situation by using the explainable AI which verifies detection processes of the neural network for the autonomous driving in accordance with one example embodiment of the present disclosure.

FIG. 2 is a flow chart schematically illustrating the learning method for providing the functional safety by warning the driver about the potential dangerous situation by using the explainable AI which verifies detection processes of the neural network for the autonomous driving in accordance with one example embodiment of the present disclosure.

For reference, in the description below, the phrase "for training" or "training" is added for terms related to the learning process, and the phrase "for testing" or "testing" is added for terms related to the testing process, to avoid possible confusion.

By referring to FIG. 2, if at least one training image for verification is acquired, the learning device for verification 100 may input the training image for verification into the neural network for the autonomous driving 200 and the property extraction module 130. If the property extraction module 130 generates at least one quality vector corresponding to the training image for verification, the learning device for verification 100 may input the quality vector into the neural network for verification 140, and if the neural network for verification 140 generates predicted safety information, corresponding to a probability of being safe to perform an autonomous driving by using the training image for verification, by applying one or more first neural network operations to the inputted quality vector, then the learning device for verification 100 may instruct the loss module 150 to calculate one or more losses by referring to the predicted safety information on the training image for verification and its corresponding GT safety information, to thereby learn at least part of one or more parameters of the neural network for verification 140 by backpropagating the losses.

Herein, the neural network for the autonomous driving 200 may be comprised of a CNN (Convolutional Neural Network), and may include at least one convolutional layer, at least one ROI pooling layer, and at least one FC layer, but the scope of the present disclosure is not limited thereto. Also, the neural network for the autonomous driving 200 may have been learned in advance before such learning processes begin, and may be included in an autonomous driving system, separate from the learning device for verification 100. A major point of the present disclosure is the neural network for verification 140 to be described later in more detail, and the neural network for the autonomous driving 200 merely generates the GT safety information to be used for learning the neural network for verification 140 thus a detailed description of a configuration of the neural network for the autonomous driving 200 is omitted.

If the training image for verification is inputted into the neural network for the autonomous driving 200, the learning device for verification 100 may instruct the neural network for the autonomous driving 200 to generate at least one predicted object detection result by applying one or more second neural network operations to the training image for verification. Thereafter, such predicted object detection result may be transmitted to the GT generation module 300, which may be included in a different computing device, and then processed to be the GT safety information, to be used for training the neural network for verification 140.

That is, if the neural network for the autonomous driving 200 generates the predicted object detection result on the training image for verification, the learning device for verification 100 may instruct the GT generating module 300 to generate a GT detection rate and GT binary information on the training image for verification by using GT object detection result corresponding to the predicted object detection result, to thereby generate GT safety information including the GT detection rate and the GT binary information. Specifically, the learning device for verification 100 may instruct the GT generating module 300 to compare the predicted object detection result and the GT object detection result, confirm that each piece of the class information for each object in the predicted object detection result is same as each piece of the class information for each object in the GT object detection result, confirm whether there is any object included in the GT object detection result but not in its corresponding predicted object detection result, to thereby calculate ratios for such cases, and then to thereby generate the GT detection rate by referring to the ratios. Also, the learning device for verification 100 may instruct the GT generating module 300 to generate the GT binary information on the training image for verification by tagging 1 if the GT detection rate is equal to or greater than a threshold, and 0 if the GT detection rate is less than the threshold. Herein, the GT binary information may be correct information representing whether it is safe to perform the autonomous driving by using the training image for verification or not. As a result, the GT safety information, to be used for training the neural network for verification 140 including the GT binary information on the training image for verification and the GT detection rate, may be generated.

It may be very economical to use such GT object detection result in order to generate the GT safety information. In case the training image for verification is one of training images used for training the autonomous driving network 200, the GT object detection result may have been acquired in advance, and it can be re-used without any additional operations thereon. Such re-usability may be a very good advantage, because it costs a lot to acquire GT images, which requires human labors for labelling images.

Meanwhile, the learning device for verification 100 may input the training image for verification into the property extraction module 130 and instruct the property extraction module 130 to generate the quality vector corresponding to the training image for verification. The quality vector may have, as its components, values of properties of the training image for verification. That is, the learning device for verification 100 may instruct the property extraction module 130 to extract property information on at least part of characteristics of the training image for verification, including at least part of an intensity, a chroma, a contrast, a noise, a color, gradients, a brightness and a camera angle from the training image for verification.

In order to extract such property information, a well-known image analyzing method or at least one neural network operation may be used. For example, if the training image for verification is in an RGB format, information on the intensity may be acquired by transforming a format of the training image for verification into HSV format, and acquire values of a V channel. Information on noise may be acquired by applying well-known de-noise operations to the training image for verification and by calculating a difference between the original training image for verification and de-noised training image for verification. Or, it may be acquired from tagged information on an ISO value of a camera used for acquiring the training image for verification. Similarly, information on the camera angle may be calculated by using information on relationships among a center point, a focal point, and a vanishing point of the training image for verification, or may be acquired by using tagged information on parameters of the camera. Information on color may be acquired by using values of R, G, and B channel of the training image for verification. Information on gradients may be acquired by performing partial differentiations to RGB values of the training image for verification in an x-axis direction and a y-axis direction. Such pieces of information can be used in a form of histogram with each of ranges, in order to reduce a usage of computing resources.

Additionally, to extract more detailed property information, the learning device for verification 100 may instruct the property extraction module 130 to extract each piece of local property information on said characteristics of the training image for verification, except the camera angle, from each of regions generated by dividing the training image for verification into such regions and applying the extraction operation to the regions, in addition to global property information on a whole part of the training image for verification, generated by applying the extraction operation to the whole part of the training image for verification. Such local property information may be included in the quality vector, along with the global property information. Otherwise, one of the local property information or the global property information may be included in the quality vector.

If the quality vector is generated, the learning device for verification 100 may instruct the neural network for verification 140 to apply one or more first neural network operations to the quality vector, to thereby generate the predicted safety information on the training image for verification. More specifically, the neural network for verification 140 may be comprised of a CNN, and may include at least one convolutional layer and at least one FC layer, and may instruct each of convolutional neurons included therein to perform the first neural network operations by using each of own parameters, to thereby generate the predicted detection rate and the predicted binary information included in the predicted safety information. In order to generate the predicted detection rate, the learning device for verification 100 may instruct the neural network for verification 140 to perform a regression by applying at least part of the first neural network operations to the quality vector. Also, in order to generate the predicted binary information, the learning device for verification 100 may instruct the neural network for verification 140 to perform a classification by applying at least part of the first neural network operations to the quality vector.

Herein, the predicted detection rate generated by the neural network for verification 140 may represent information on how many of objects in the training image for verification will be detected by the neural network for the autonomous driving 200, or more specifically, represent a ratio of (r1) the number of specific objects, among the objects included in the training image for verification, predicted to be correctly detected by the neural network for the autonomous driving, to (r2) the number of the objects included in the training image for verification. Also, the predicted binary information on the training image for verification generated by the neural network for verification 140 may represent whether the training image for verification corresponding to the inputted quality vector is appropriate for the neural network for the autonomous driving 200 to perform its detection function, or more specifically, represent whether it is safe to perform the autonomous driving by using the training image for verification or not.

That is, the neural network for verification 140 may acquire the properties of images as its input, and may output information on whether the images are appropriate, to thereby quantitatively determine whether the acquired images are appropriate to the object detection.

If the predicted binary information on the training image for verification and the predicted detection rate for training, are acquired, the learning device for verification 100 may instruct the loss module 150 to calculate the losses by referring to the predicted binary information, the predicted detection rate, and the GT safety information including the GT binary information and the GT detection rate, and learn at least part of the parameters of the neural network for verification 140 by backpropagating the losses. As a result, the neural network for verification 140 may become able to determine whether its inputted images are appropriate for the object detection, and predict their corresponding detection rates of the neural network for the autonomous driving 200 by using their corresponding quality vectors.

Figure 3:
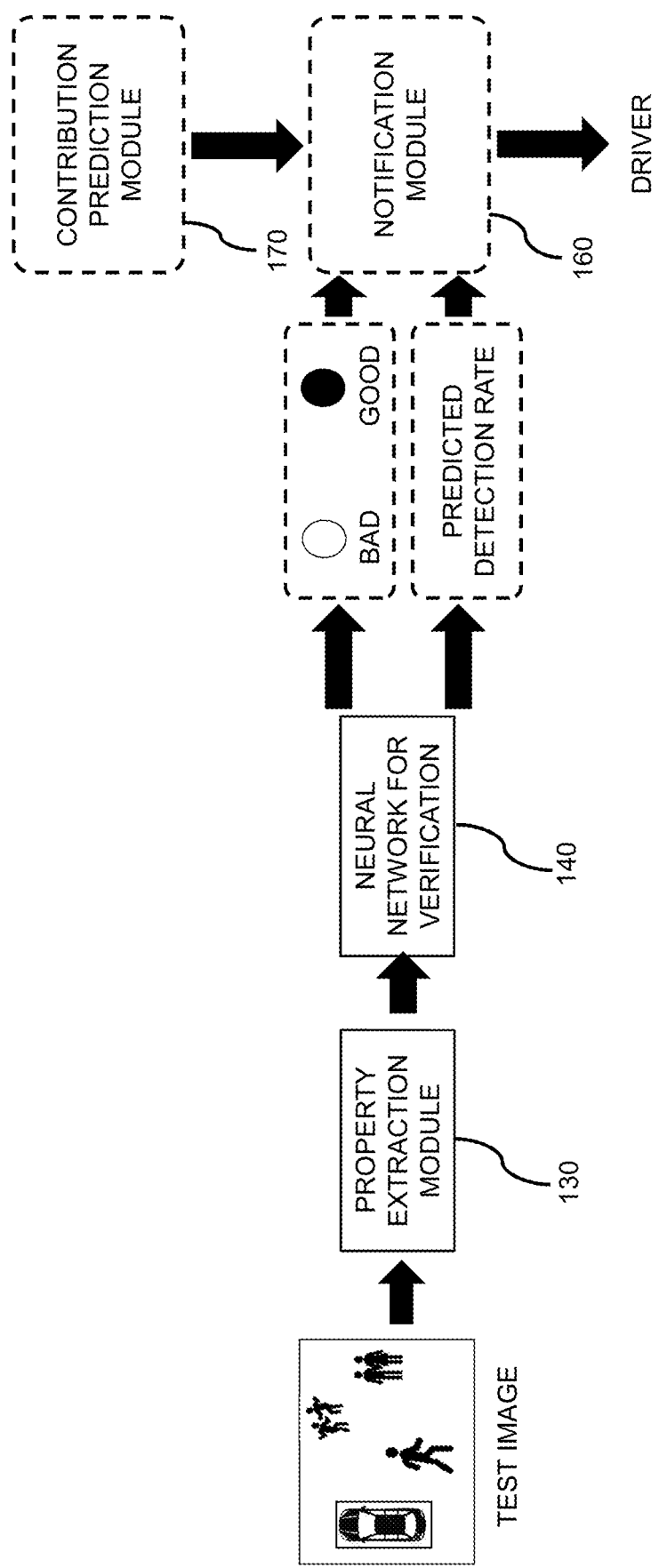
FIG. 3 is a flow chart schematically illustrating a testing method for providing the functional safety by warning the driver about the potential dangerous situation by using the explainable AI which verifies detection processes of the neural network for the autonomous driving in accordance with one example embodiment of the present disclosure.

The learning method in accordance with the present disclosure is described above in detail, and a testing method in accordance with the present disclosure is described by referring to FIG. 3.

FIG. 3 is a flow chart schematically illustrating a testing method for providing the functional safety by warning the driver about the potential dangerous situation by using the explainable AI which verifies detection processes of the neural network for the autonomous driving in accordance with one example embodiment of the present disclosure.

By referring to FIG. 3, the testing method performed by a testing device for verification on condition that the learning device for verification 100 has completed learning of the neural network for verification 140 is shown. As will be described below, a configuration of the testing device is implemented by removing the loss module 150 from the learning device for verification 100 and instead adding a notification module 160 and a contribution prediction module 170. The learning device for verification 100 and the testing device for verification may be a same computing device, but may be different devices as the case may be. The testing device for verification as such may be mounted on an autonomous vehicle. That is, the testing device may determine whether the image acquired by the autonomous vehicle is appropriate for the object detection so that the safe autonomous driving is possible, and may notify a driver of the fact about whether the safe autonomous driving is possible or not.

Specifically, on condition that (1) the learning device for verification 100, to be used for training the neural network for verification 140, has instructed the property extraction module 130 to apply the extraction operation to the training image for verification in order to extract property information for training on at least part of the characteristics of the training image for verification, including at least part of the intensity, the contrast, the noise, the chroma, the color, the gradient, the brightness and the camera angle, to thereby generate a quality vector for training corresponding to the training image for verification; (2) the learning device for verification has instructed the neural network for verification 140 to apply the first neural network operations to the quality vector for training, to thereby generate the predicted safety information for training on a probability of being safe to perform an autonomous driving by using the training image for verification; and (3) the learning device for verification 100 has instructed the loss module 150 to generate the losses by referring to the predicted safety information for training and the GT safety information corresponding to the training image for verification, and perform the backpropagation by using the losses, to thereby learn at least part of the parameters included in the neural network for verification 140, if at least one test image for verification is acquired, may instruct the property extraction module 130 to apply the extraction operation to the test image for verification in order to extract property information for testing on at least part of the characteristics of the test image for verification, including at least part of the intensity, the contrast, the noise, the chroma, the color, the gradient, the brightness and the camera angle, to thereby generate a quality vector for testing corresponding to the test image for verification.

Thereafter, the testing device for verification may instruct the neural network for verification 140 to apply the first neural network operations to the quality vector for testing, to thereby generate predicted safety information for testing on a probability of being safe to perform an autonomous driving by using the test image for verification.

Finally, the testing device for verification may instruct the notification module 160 to transmit a 1-st notice to a driver in case it is predicted to be safe to use the test image for verification during the autonomous driving, and to transmit a 2-nd notice to the driver in case it is predicted to be unsafe to use the test image for verification during the autonomous driving, by referring to the predicted safety information for testing.

Herein, the 1-st notice may represent that predicted binary information for testing indicates that it is safe to use the test image for verification during the autonomous driving. In this case, the 1-st notice may include a (1_1)-st notice representing that the autonomous driving is being executed safely and a (1_2)-nd notice including information on the predicted detection rate for testing. As a result, while the autonomous driving is being performed safely, a fact that the autonomous driving is being performed safely may be provided to the driver with specific values included, to thereby assure the driver of the safety.

On the contrary, the 2-nd notice may represent that the predicted binary information for testing indicates that it is not safe to use the test image for verification during the autonomous driving. In this case, the 2-nd notice may include a (2_1)-st notice indicating that the autonomous driving is not being executed safely and a (2_2)-nd notice including predicted contribution information on which component of the test image for verification is causing unsafety of the autonomous driving. In order to explain how the predicted contribution information is generated, the contribution prediction module 170 in the testing device is described by referring to FIG. 4.

FIG. 4 is a drawing schematically illustrating an operation of a contribution prediction module for performing a testing method for providing the functional safety by warning the driver about the potential dangerous situation by using the explainable AI which verifies detection processes of the neural network for the autonomous driving in accordance with one example embodiment of the present disclosure.

By referring to FIG. 4, a reverse analysis operation, to be used for generating the predicted contribution information, may be understood. That is, if the predicted binary information for testing represents the unsafety, the testing device for verification may instruct the contribution prediction module 170 to generate the predicted contribution information representing that which component in the quality vector for testing contributes to the predicted binary information for testing. Specifically, the testing device for verification may instruct the contribution prediction module 170 to acquire information on weight operation outputs. Herein, the weight operation outputs may be intermediate products generated when convolutional neurons included in the neural network for verification 140 apply the first neural network operations to the quality vector for testing by using their own parameters.

After such information on the weight operation outputs is acquired, the testing device for verification may instruct the contribution prediction module 170 to apply the reverse analysis operation to the predicted binary information for testing by using the information on the weight operation outputs. The reverse analysis operation may be an operation for iteratively select a specific (N−1)-th weight operation output which satisfies a prescribed criterion, among (N−1)-th weight operation outputs which have been used for generating a specific N-th weight operation output which satisfies the prescribed criterion, among N-th weight operation outputs. Herein, as an example, the criterion may be satisfied when a certain weight operation output is the largest among its corresponding weight operation outputs. An example of applying the reverse analysis operation may be explained by referring to FIG. 4.

FIG. 4 shows a simplified example of the neural network for verification 140 including one hidden layer having three nodes. In real implementation, it may include much more hidden layers and nodes, but for convenience of explanation, it is simplified. Also, in FIG. 4, thicknesses of lines may denote sizes of corresponding weight operation outputs. Under such suppositions, the reverse analysis operation may be explained.

By referring to FIG. 4, it may be seen that a final node value 171, which finally contributes to a generation of the predicted binary information for testing, is generated by summing a (1_1)-st weight operation output 171-1, a (1_2)-nd weight operation output 171-2 and a (1_3)-rd weight operation output 171-3, and the (1_1)-st weight operation output 171-1 is the largest among those. In this case, when applying the reverse analysis operation, the contribution prediction module 170 may select the (1_1)-st weight operation output 171-1 as a 1-st specific weight operation output for its corresponding hidden layer. And, it can be also seen that a (1_1)-st node value 172 corresponding to the (1_1)-st weight operation output 171-1 is generated by summing many values, but a (2_1)-st weight operation output 172-1 and a (2_2)-nd weight operation output 172-2 are the largest. In this case, at least one of the (2_1)-st weight operation output 172-1 and the (2_2)-nd weight operation output 172-2 may be selected as a 2-nd specific weight operation value. Thereafter, by referring to the 2-nd specific weight operation value, a specific contribution score of its corresponding specific component of the quality vector for testing will be calculated, and the predicted contribution information representing that the specific component is causing the unsafety will be generated in case the specific contribution score is larger than a prescribed threshold.

After such predicted contribution information is generated, the testing device for verification may instruct the notification module 160 to generate the (2_2)-nd notice by referring to the predicted contribution information. For example, if the predicted contribution information indicates that the unsafety is caused by a low intensity on a right side of the test image, then the (2_2)-nd notification may include a message for the driver to handle a sunshade.

As a result, the testing device for verification may help more optimized autonomous driving by providing a notification for assuring the driver if the test image is appropriate to the object detection, and a warning along with its solution if the test image is not appropriate to the object detection.

The present disclosure has an effect of providing the learning method for quantitatively determining whether the image is appropriate to the object detection by using the property information of the image and notifying the user, to thereby allow the safe autonomous driving.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A learning method for providing a functional safety by warning a driver about a potential dangerous situation by using an explainable AI which verifies detection processes of a neural network for an autonomous driving, comprising steps of:
    (a) in response to at least one training image for verification being acquired, a learning device for verification, to be used for training a neural network for verification, instructing a property extraction module to apply at least one extraction operation to the training image for verification in order to extract property information on one or more characteristics of the training image for verification, including one or more of an intensity, a contrast, a noise, a chroma, a color, gradients, a brightness and a camera angle, to thereby generate a quality vector corresponding to the training image for verification;

(b) the learning device for verification instructing the neural network for verification to apply one or more first neural network operations to the quality vector, to thereby generate predicted safety information on a probability of being safe to perform an autonomous driving by using the training image for verification; and (c) the learning device for verification instructing a loss module to generate a loss by referring to the predicted safety information and ground-truth (GT) safety information corresponding to the training image for verification, and perform a backpropagation by using the loss, to thereby learn at least part of parameters included in the neural network for verification, wherein, at the step of (b), the learning device for verification instructs the neural network for verification to perform a process of (i) a regression by applying at least part of the first neural network operations to the quality vector, to thereby generate a predicted detection rate corresponding to a ratio of (r1) the number of specific objects, among objects included in the training image for verification, predicted to be correctly detected by the neural network for the autonomous driving, to (r2) the number of the objects included in the training image for verification, and (ii) a classification by applying at least part of the first neural network operations to the quality vector, to thereby generate predicted binary information representing whether it is safe to perform the autonomous driving by using the training image for verification or not, in order to generate the predicted safety information including the predicted detection rate and the predicted binary information;

wherein the neural network for verification has been trained to perform the classification by referring to information on whether a ground-truth detection rate is larger than a pre-defined threshold.

2. The method of claim 1, wherein, before the step (c), the learning device for verification instructs the neural network for the autonomous driving, included in an autonomous driving system, to apply one or more second neural network operations to the training image for verification, in order to predict information on objects included in the training image for verification, to thereby generate a predicted object detection result, and instructs a GT generating module interlocking with the neural network for the autonomous driving to calculate a GT detection rate by referring to the predicted object detection result and a GT object detection result including correct information on the objects included in the training image for verification, and to generate GT binary information by referring to information on whether the GT detection rate is larger than a prescribed threshold, to thereby generate the GT safety information including the GT detection rate and the GT binary information.

3. The method of claim 1, wherein, at the step of (a), the learning device for verification instructs the property extraction module to perform at least one of (i) a process of generating each piece of local property information on each region of the training image for verification by dividing the training image for verification into a plurality of regions, and applying the extraction operation to each region, and (ii) a process of generating global property information on a whole part of the training image for verification by applying the extraction operation to the whole part of the training image for verification, to thereby generate the quality vector including at least one of the local property information and the global property information.

4. A testing method for providing a functional safety by warning a driver about a potential dangerous situation by using an explainable AI which verifies detection processes of a neural network for an autonomous driving, comprising steps of:

(a) in response to (1) a learning device for verification, to be used for training a neural network for verification, in response to at least one training image for verification being acquired, having instructed a property extraction module to apply at least one extraction operation to the training image for verification in order to extract property information for training on one or more characteristics of the training image for verification, including one or more of an intensity, a contrast, a noise, a chroma, a color, a gradient, a brightness and a camera angle, to thereby generate a quality vector for training corresponding to the training image for verification; (2) the learning device for verification has instructed the neural network for verification to apply one or more first neural network operations to the quality vector for training, to thereby generate predicted safety information for training on a probability of being safe to perform an autonomous driving by using the training image for verification; and (3) the learning device for verification has instructed a loss module to generate a loss by referring to the predicted safety information for training and ground-truth (GT) safety information corresponding to the training image for verification, and perform a backpropagation by using the loss, to thereby learn at least part of parameters included in the neural network for verification, a testing device for verification, in response to at least one test image for verification being acquired, instructing the property extraction module to apply the extraction operation to the test image for verification in order to extract property information for testing on one or more characteristics of the test image for verification, including one or more of an intensity, a contrast, a noise, a chroma, a color, a gradient, a brightness and a camera angle, to thereby generate a quality vector for testing corresponding to the test image for verification;

(b) the testing device for verification instructing the neural network for verification to apply the first neural network operations to the quality vector for testing, to thereby generate predicted safety information for testing on a probability of being safe to perform an autonomous driving by using the test image for verification; and (c) the testing device for verification instructing a notification module to transmit a 1-st notice to a driver in case it is predicted to be safe to use the test image for verification during the autonomous driving, and to transmit a 2-nd notice to the driver in case it is predicted to be unsafe to use the test image for verification during the autonomous driving, by referring to the predicted safety information for testing, wherein, at the step of (b), the testing device for verification instructs the neural network for verification to perform a process of (i) a regression by applying at least part of the first neural network operations to the quality vector for testing, to thereby generate a predicted detection rate for testing corresponding to a ratio of (r1) the number of specific objects for testing, among objects for testing included in the test image for verification, predicted to be correctly detected by the neural network for the autonomous driving, to (r2) the number of the objects for testing included in the test image for verification, and (ii) a classification by applying at least part of the first neural network operations to the quality vector for testing, to thereby generate predicted binary information for testing representing whether it is safe to perform the autonomous driving by using the test image for verification or not, in order to generate the predicted safety information for testing including the predicted detection rate for testing and the predicted binary information for testing;

wherein the neural network for verification has been trained to perform the classification by referring to information on whether a ground-truth detection rate is larger than a pre-defined threshold.

5. The method of claim 4, wherein the testing device for verification instructs the notification module to transmit the 1-st notice to the driver in case the predicted binary information for testing indicates that it is safe to use the test image for verification during the autonomous driving, wherein the 1-st notice includes a (1_1)-st notice indicating that the autonomous driving is being executed safely, and a (1_2)-nd notice including information on the predicted detection rate for testing.

6. The method of claim 4, wherein the testing device for verification instructs the notification module to transmit the 2-nd notice to the driver in case the predicted binary information for testing indicates that it is not safe to use the test image for verification during perform the autonomous driving, wherein the 2-nd notice includes a (2_1)-st notice indicating that the autonomous driving is not being executed safely, and a (2_2)-nd notice including predicted contribution information including information on which component of the test image for verification is causing unsafety of the autonomous driving.

7. The method of claim 6, wherein the testing device for verification, in case the predicted binary information for testing represents that it is not safe to use the test image for verification during the autonomous driving, instructs a contribution prediction module to apply at least one reverse analysis operation to the predicted binary information for testing by using information on weight operation outputs, corresponding to components of the quality vector for testing, generated by each of convolutional neurons included in the neural network for verification, to thereby (i) select at least one specific component, among the components of the quality vector for testing, whose specific contribution score for the predicted binary information for testing is larger than a prescribed threshold, and (ii) generate the predicted contribution information, including information on which property of the test image for verification is causing the unsafety of the autonomous driving, by referring to the specific component.

8. The method of claim 7, wherein the testing device for verification instructs the contribution prediction module to apply the reverse analysis operation to a final node value used for generating the predicted binary information for testing in a backward direction, to thereby (i) generate one or more contribution scores for at least part of the components of the quality vector for testing, (ii) select the specific component of the quality vector for testing whose specific contribution score is larger than the prescribed threshold, and (iii) generate the predicted contribution information by referring to the specific component, wherein the reverse analysis operation is used for iteratively selecting a specific first weight operation output which satisfies a prescribed criterion, among first weight operation outputs which have been used for generating a specific second weight operation output which satisfies the prescribed criterion.

9. The method of claim 4, wherein, at the step of (a), the testing device for verification instructs the property extraction module to perform at least one of (i) a process of generating each piece of local property information for testing on each region of the test image for verification by dividing the test image for verification into a plurality of regions, and applying the extraction operation to each region, and (ii) a process of generating global property information for testing on a whole part of the test image for verification by applying the extraction operation to the whole part of the test image for verification, to thereby generate the quality vector for testing including at least one of the local property information for testing and the global property information for testing.

10. A learning device for providing a functional safety by warning a driver about a potential dangerous situation by using an explainable AI which verifies detection processes of a neural network for an autonomous driving, comprising:
at least one memory that stores instructions; and
at least one processor configured to execute the instructions to perform processes of: (I) if at least one training image for verification is acquired, instructing a property extraction module to apply at least one extraction operation to the training image for verification in order to extract property information on one or more characteristics of the training image for verification, including one or more of an intensity, a contrast, a noise, a chroma, a color, gradients, a brightness and a camera angle, to thereby generate a quality vector corresponding to the training image for verification; (II) instructing the neural network for verification to apply one or more first neural network operations to the quality vector, to thereby generate predicted safety information on a probability of being safe to perform an autonomous driving by using the training image for verification; and (III) instructing a loss module to generate a loss by referring to the predicted safety information and ground-truth (GT) safety information corresponding to the training image for verification, and perform a backpropagation by using the loss, to thereby learn at least part of parameters included in the neural network for verification,
wherein, at the process of (II), the processor instructs the neural network for verification to perform a process of (i) a regression by applying at least part of the first neural network operations to the quality vector, to thereby generate a predicted detection rate corresponding to a ratio of (r1) the number of specific objects, among objects included in the training image for verification, predicted to be correctly detected by the neural network for the autonomous driving, to (r2) the number of the objects included in the training image for verification, and (ii) a classification by applying at least part of the first neural network operations to the quality vector, to thereby generate predicted binary information representing whether it is safe to perform the autonomous driving by using the training image for verification or not, in order to generate the predicted safety information including the predicted detection rate and the predicted binary information;
wherein the neural network for verification has been trained to perform the classification by referring to information on whether a ground-truth detection rate is larger than a pre-defined threshold.

11. The device of claim 10, wherein, before the process (III), the processor instructs the neural network for the autonomous driving, included in an autonomous driving system, to apply one or more second neural network operations to the training image for verification, in order to predict information on objects included in the training image for verification, to thereby generate a predicted object detection result, and instructs a GT generating module interlocking with the neural network for the autonomous driving to calculate a GT detection rate by referring to the predicted object detection result and a GT object detection result including correct information on the objects included in the training image for verification, and to generate GT binary information by referring to information on whether the GT detection rate is larger than a prescribed threshold, to thereby generate the GT safety information including the GT detection rate and the GT binary information.

12. The device of claim 10, wherein, at the process of (I), the processor instructs the property extraction module to perform at least one of (i) a process of generating each piece of local property information on each region of the training image for verification by dividing the training image for verification into a plurality of regions, and applying the extraction operation to each region, and (ii) a process of generating global property information on a whole part of the training image for verification by applying the extraction operation to the whole part of the training image for verification, to thereby generate the quality vector including at least one of the local property information and the global property information.

13. A testing device for providing a functional safety by warning a driver about a potential dangerous situation by using an explainable AI which verifies detection processes of a neural network for an autonomous driving, comprising:
at least one memory that stores instructions; and
at least one processor configured to execute the instructions to perform processes of: (I) on condition that (1) a learning device for verification, to be used for training a neural network for verification, has instructed a property extraction module to apply at least one extraction operation to a training image for verification in order to extract property information for training on at least part of characteristics of the training image for verification, including at least part of an intensity, a contrast, a noise, a chroma, a color, a gradient, a brightness and a camera angle, to thereby generate a quality vector for training corresponding to the training image for verification; (2) the learning device for verification has instructed the neural network for verification to apply one or more first neural network operations to the quality vector for training, to thereby generate predicted safety information for training on a probability of being safe to perform an autonomous driving by using the training image for verification; and (3) the learning device for verification has instructed a loss module to generate a loss by referring to the predicted safety information for training and ground-truth (GT) safety information corresponding to the training image for verification, and perform a back-propagation by using the loss, to thereby learn at least part of parameters included in the neural network for verification, if at least one test image for verification is acquired, instructing the property extraction module to apply the extraction operation to the test image for verification in order to extract property information for testing on at least part of characteristics of the test image for verification, including at least part of an intensity, a contrast, a noise, a chroma, a color, a gradient, a brightness and a camera angle, to thereby generate a quality vector for testing corresponding to the test image for verification; (II) instructing the neural network for verification to apply the first neural network operations to the quality vector for testing, to thereby generate predicted safety information for testing on a probability of being safe to perform an autonomous driving by using the test image for verification; and (III) instructing a notification module to transmit a 1-st notice to a driver in case it is predicted to be safe to use the test image for verification during the autonomous driving, and to transmit a 2-nd notice to the driver in case it is predicted to be unsafe to use the test image for verification during the autonomous driving, by referring to the predicted safety information for testing;
wherein, at the process of (II), the processor instructs the neural network for verification to perform a process of (i) a regression by applying at least part of the first neural network operations to the quality vector for testing, to thereby generate a predicted detection rate for testing corresponding to a ratio of (r1) the number of specific objects for testing, among objects for testing included in the test image for verification, predicted to be correctly detected by the neural network for the autonomous driving, to (r2) the number of the objects for testing included in the test image for verification, and (ii) a classification by applying at least part of the first neural network operations to the quality vector for testing, to thereby generate predicted binary information for testing representing whether it is safe to perform the autonomous driving by using the test image for verification or not, in order to generate the predicted safety information for testing including the predicted detection rate for testing and the predicted binary information for testing;
wherein the neural network for verification has been trained to perform the classification by referring to information on whether a ground-truth detection rate is larger than a pre-defined threshold.

14. The device of claim 13, wherein the processor instructs the notification module to transmit the 1-st notice to the driver in case the predicted binary information for testing indicates that it is safe to use the test image for verification during the autonomous driving, wherein the 1-st notice includes a (1_1)-st notice indicating that the autonomous driving is being executed safely, and a (1_2)-nd notice including information on the predicted detection rate for testing.

15. The device of claim 13, wherein the processor instructs the notification module to transmit the 2-nd notice to the driver in case the predicted binary information for testing indicates that it is not safe to use the test image for verification during perform the autonomous driving, wherein the 2-nd notice includes a (2_1)-st notice indicating that the autonomous driving is not being executed safely, and a (2_2)-nd notice including predicted contribution information including information on which component of the test image for verification is causing unsafety of the autonomous driving.

16. The device of claim 15, wherein the processor, in case the predicted binary information for testing represents that it is not safe to use the test image for verification during the autonomous driving, instructs a contribution prediction module to apply at least one reverse analysis operation to the predicted binary information for testing by using information on weight operation outputs, corresponding to components of the quality vector for testing, generated by each of convolutional neurons included in the neural network for verification, to thereby (i) select at least one specific component, among the components of the quality vector for testing, whose specific contribution score for the predicted binary information for testing is larger than a prescribed threshold, and (ii) generate the predicted contribution information, including information on which property of the test image for verification is causing the unsafety of the autonomous driving, by referring to the specific component.

17. The device of claim 16, wherein the processor instructs the contribution prediction module to apply the reverse analysis operation to a final node value used for generating the predicted binary information for testing in a backward direction, to thereby (i) generate one or more contribution scores for at least part of the components of the quality vector for testing, (ii) select the specific component of the quality vector for testing whose specific contribution score is larger than the prescribed threshold, and (iii) generate the predicted contribution information by referring to the specific component, wherein the reverse analysis operation is used for iteratively selecting a specific first weight operation output which satisfies a prescribed criterion, among first weight operation outputs which have been used for generating a specific second weight operation output which satisfies the prescribed criterion.

18. The device of claim 13, wherein, at the process of (I), the processor instructs the property extraction module to perform at least one of (i) a process of generating each piece of local property information for testing on each region of the test image for verification by dividing the test image for verification into a plurality of regions, and applying the extraction operation to each region, and (ii) a process of generating global property information for testing on a whole part of the test image for verification by applying the extraction operation to the whole part of the test image for verification, to thereby generate the quality vector for testing including at least one of the local property information for testing and the global property information for testing.

* * * * *